United States Patent
Gabriel et al.

(10) Patent No.: US 8,480,500 B2
(45) Date of Patent: Jul. 9, 2013

(54) APPARATUS AND METHOD OF MAKING A HEEL-LESS NAIL

(75) Inventors: William L. Gabriel, Barrington, IL (US); Zafar I Ali, Tinley Park, IL (US); Alvis H. Ferrell, Brighton, TN (US); Daniel P. McDonald, Palatine, IL (US); James W. Robinson, Mundelein, IL (US); Donald E. Bergstrom, Lake Villa, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/981,011

(22) Filed: Dec. 29, 2010

(65) Prior Publication Data
US 2011/0098122 A1 Apr. 28, 2011

Related U.S. Application Data

(62) Division of application No. 12/175,704, filed on Jul. 18, 2008, now Pat. No. 8,100,618.

(51) Int. Cl.
*B21G 3/00* (2006.01)

(52) U.S. Cl.
USPC ............... 470/40; 470/34; 470/137; 470/150; 470/192

(58) Field of Classification Search
USPC ............... 72/214, 220; 470/34, 40, 110, 121, 470/125, 127, 137, 141, 144, 146, 148, 150, 470/192, 195
See application file for complete search history.

(56) References Cited

U.S. PATENT DOCUMENTS

| | | | |
|---|---|---|---|
| 387,066 A | 7/1888 | Greer | |
| 387,068 A | 7/1888 | Greer | |
| 451,859 A | 5/1891 | Hammond et al. | |
| 722,669 A * | 3/1903 | Brigham | 470/125 |

(Continued)

FOREIGN PATENT DOCUMENTS

| | | |
|---|---|---|
| BE | 867802 A | 10/1978 |
| CN | 1188390 A | 7/1998 |

(Continued)

OTHER PUBLICATIONS

International Search Report and the Written Opinion of the International Searching Authority issued Jun. 25, 2009, in connection with PCT/US2009/0045121.

(Continued)

*Primary Examiner* — Edward Tolan
(74) *Attorney, Agent, or Firm* — Levenfeld Pearlstein, LLC

(57) ABSTRACT

A full-round head nail having an offset head is configured with a gusset formed integrally between an undersurface of the offset head and a superior portion of a shank. The head of the nail is relatively thin, and the shank is positioned radially off center of the round head such that no heel is formed at a point tangential to both the head and the shank. The gusset has a lofted surface tapering radially from a roundness at the zero heel to a taper at the toe. The gusset reinforces the junction of the shank with the head, supports the toe of the head, and distributes the force of a load on the head through a longitudinal axis of the shank, preventing the toe from bending or yielding and prevents the shank from yielding to the stresses of the load applied.

2 Claims, 12 Drawing Sheets

U.S. PATENT DOCUMENTS

| | | | |
|---|---|---|---|
| 1,042,955 A | | 10/1912 | Nurnberger |
| 1,298,015 A | | 3/1919 | Curtis |
| 1,333,859 A | | 3/1920 | Lundie |
| 1,456,682 A | | 5/1923 | Steffe |
| 1,899,264 A | | 2/1933 | Faries |
| 2,513,513 A | | 7/1950 | Bunnosuke |
| 3,109,187 A | * | 11/1963 | Pirc .................. 470/121 |
| 3,358,822 A | | 12/1967 | O'Connor |
| 3,359,582 A | | 12/1967 | Powers |
| 3,861,526 A | | 1/1975 | Leistner |
| 3,935,945 A | | 2/1976 | Smith et al. |
| 4,309,885 A | * | 1/1982 | Nielsen et al. ............ 72/197 |
| 4,881,395 A | * | 11/1989 | Shinjo ...................... 72/90 |
| 5,020,353 A | * | 6/1991 | Christiansen ............ 72/187 |
| 5,056,976 A | | 10/1991 | Sygnator et al. |
| 5,060,797 A | | 10/1991 | Sygnator |
| 5,154,670 A | | 10/1992 | Sygnator et al. |
| 5,195,931 A | | 3/1993 | Wright et al. |
| 5,224,253 A | * | 7/1993 | Sawa .................... 29/243.58 |
| 5,395,197 A | | 3/1995 | Cario et al. |
| 5,476,351 A | | 12/1995 | Binder et al. |
| 5,482,419 A | | 1/1996 | Leistner |
| 5,533,379 A | | 7/1996 | Binder et al. |
| 5,651,739 A | * | 7/1997 | Carlsen .................. 470/129 |
| 5,988,967 A | * | 11/1999 | Jones ..................... 411/489 |
| D418,400 S | | 1/2000 | Juska |
| 6,676,528 B1 | * | 1/2004 | Carlsen .................. 470/137 |
| 7,014,407 B2 | | 3/2006 | Crompton et al. |
| 7,374,383 B2 | | 5/2008 | Crompton et al. |
| 2002/0052244 A1 | | 5/2002 | Halstead et al. |

FOREIGN PATENT DOCUMENTS

| | | |
|---|---|---|
| CN | 1703291 A | 11/2005 |
| DE | 1808604 A | 11/1969 |
| FR | 2227453 A1 | 11/1974 |
| WO | 9742421 A1 | 11/1997 |

OTHER PUBLICATIONS

International Search Report issued Sep. 24, 1997, in connection with PCT/US1997/07262.

* cited by examiner

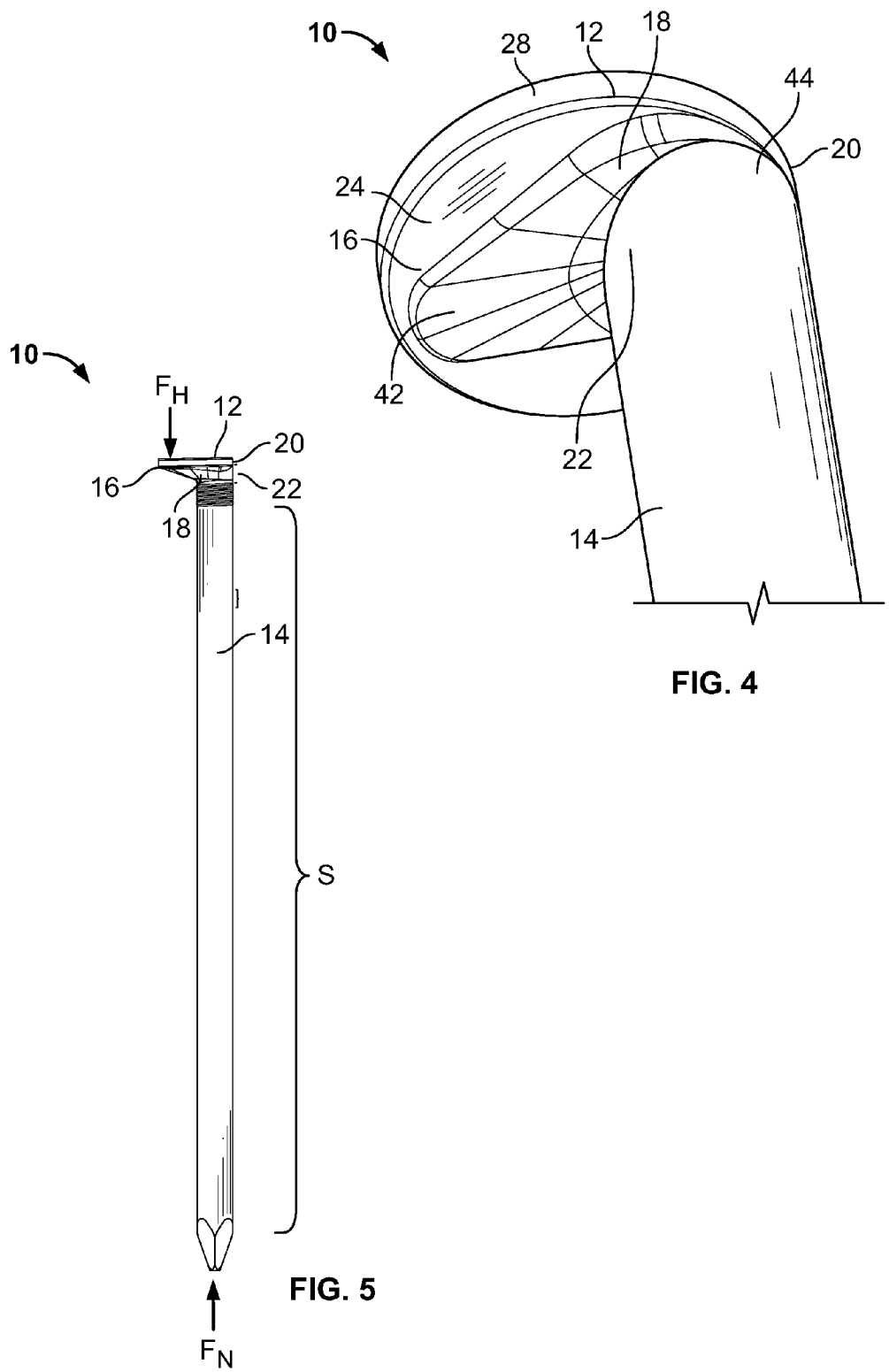

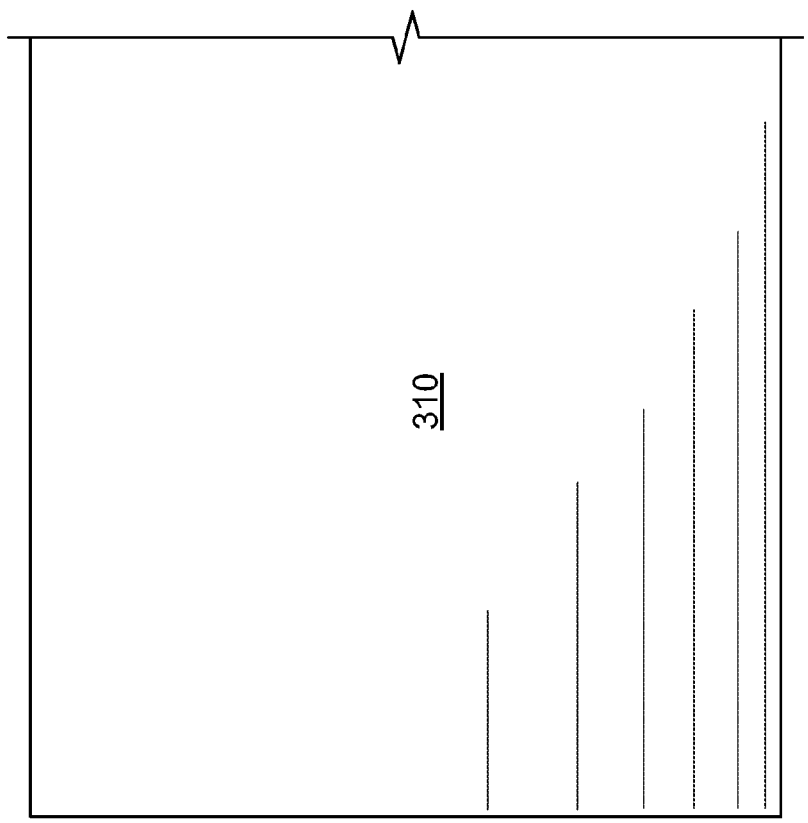
FIG. 11
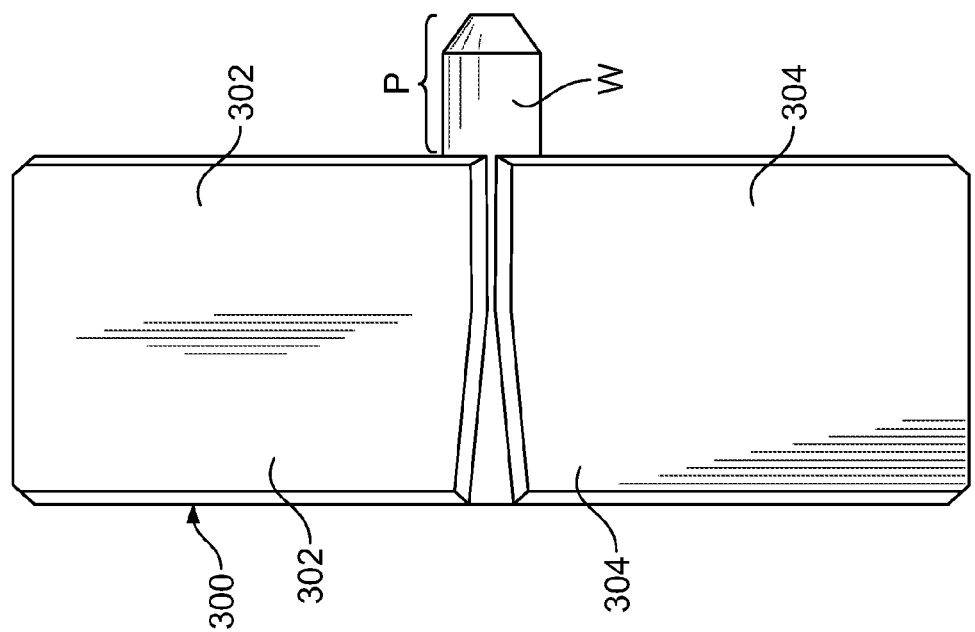

APPARATUS AND METHOD OF MAKING A HEEL-LESS NAIL

BACKGROUND OF THE INVENTION

The present invention is directed to a nail. More particularly, the present invention pertains to a radially offset, full-round headed nail and a method of making same.

Nails are often used in power driving tools to quickly and efficiently secure objects such as wood. Generally, nails have a head and an elongated shank and are linearly collated in an adhesive strip made of plastic with or without paper backing material with the shanks oriented in a parallel relationship. The nails are ejected sequentially as the driver blade of the power driving tool strikes each of the heads individually. The nails in the strip are, therefore, spaced apart so that the heads do not interfere with each other during discharge. As a result, because of the size and configuration of full-round heads, only a limited number of full-round head nails may be included in a particular strip.

To increase the number of nails apportioned in a strip, manufacturers have developed off-set nails in which the longitudinal axis of the shank is positioned radially off-center of the head. An offset head generally has a toe and a heel. The toe refers to the greater portion of the offset head that is unsupported by the shank, in the direction opposite to the radial displacement of the shank. The heel refers to the portion of the head unsupported by the shank, in the direction of radial displacement of the shank from the center of the head.

Offset nails allow the pitch, i.e., the distance between the shanks, of the offset nails to be closer together, allowing additional offset nails to be included per strip than traditional nails in a comparable strip. The power driving tool, therefore, needs to be reloaded less often, saving time. Often these offset nails are also redesigned with elongated or non-rounded heads because non-round head nails are easier to form than full-round head nails. Offset full-round head nails, however, are readily identified with concentric round head nails where construction codes define nail heads in specific fastening applications. The round head nails have a full 360 degree rim (as opposed to a 180 degree or other shaped configuration of head) giving extra clamping or, "hold down" so to speak, when the nail is driven into a nailing medium.

When the head of a offset full-round head nail is struck, however, it experiences similar deformations as a non-round head nail. Due to the configuration of the nails in the collated strip, the offset nail is struck at a position not supported by the shank, at the toe. The force of the driving blade can bend the toe of the head if the head is not supported properly or if the head is too thin. In addition, the shank may also bend if the load from the force of the driving blade strike is not distributed through the axis of the shank properly. Furthermore, the junction between the head and the shank may not be strongly attached, thus leading to breakage during nailing and causing the power driving tool to jam or fail.

To compensate for these challenges, offset full-round head nails have been manufactured with thickened heads. In addition, these nails have been manufactured such that the shank is slightly off-center to take advantage of the ability to combine more nails in a strip, but are not fully off-center of the head, leaving a small heel, so that less of a toe is present. However, these solutions require additional material to be used to make the head thicker, and the number of nails per strip is not maximized because of the presence of the heel on the head.

Accordingly, there is a need for an offset head with a full-round head that can be collated to maximize the number of nails in a strip. In addition, it would be desirable for such a nail to withstand large forces without bending or yielding without adding material, and more desirably, using less material than currently known with offset full-round head nails.

BRIEF SUMMARY OF THE INVENTION

A full-round head nail having an offset head integrally connected to a shank is configured with a gusset formed integrally between an undersurface of the offset head and a superior portion of the shank. The head of the nail is relatively thin when compared to known off-set full-round-head nails, and the shank is positioned radially off center of the round head such that no heel is formed at a point tangential to both the head and the shank.

The ovoid or pear-shaped gusset is a lofted shape tapering radially from a roundness at the zero heel to a taper at the toe and flows from along an undersurface of the head, tapering down to the superior surface of the shank. The gusset reinforces the junction of the shank with the head while providing support for the toe of the head, i.e., the portion of the head not supported by the shank. The gusset also distributes the force of a load on the head through the longitudinal axis of the shank. The distribution of the load prevents the toe from bending or yielding and prevents the shank from yielding to the stresses of the load applied.

The nail is manufactured using either a single blow impact nail heading machine or using a cold rolling technology machine. For the latter, a wire is inserted into a die formed complimentary to the shape of the nail. The cold rolling technique uses a first roller to prebend the wire in the die and then a second roller to compress the wire within the die to form the nail head and gusset beneath it. The ovoid or pear form gusset geometry, in combination with the amount of material clamped in the prebend position, combine to form a round head as the material naturally flows under the compressive load from the second head roller.

The die to form the offset full-round head nail is made from two grippers. The grippers have cavities complimentary to the shank and the gusset of the nail. The complimentary gusset portion of the die [gripper] facilitates the flow of the metal wire to produce a full-round head.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 4 is a perspective view of the undersurface of the present nail head;

FIG. 5 is a side view of the present nail;

FIGS. 11-14 illustrate a side view of the die used in a present method for manufacturing the full-round head of the present nail;

DETAILED DESCRIPTION OF THE INVENTION

Figure 1:
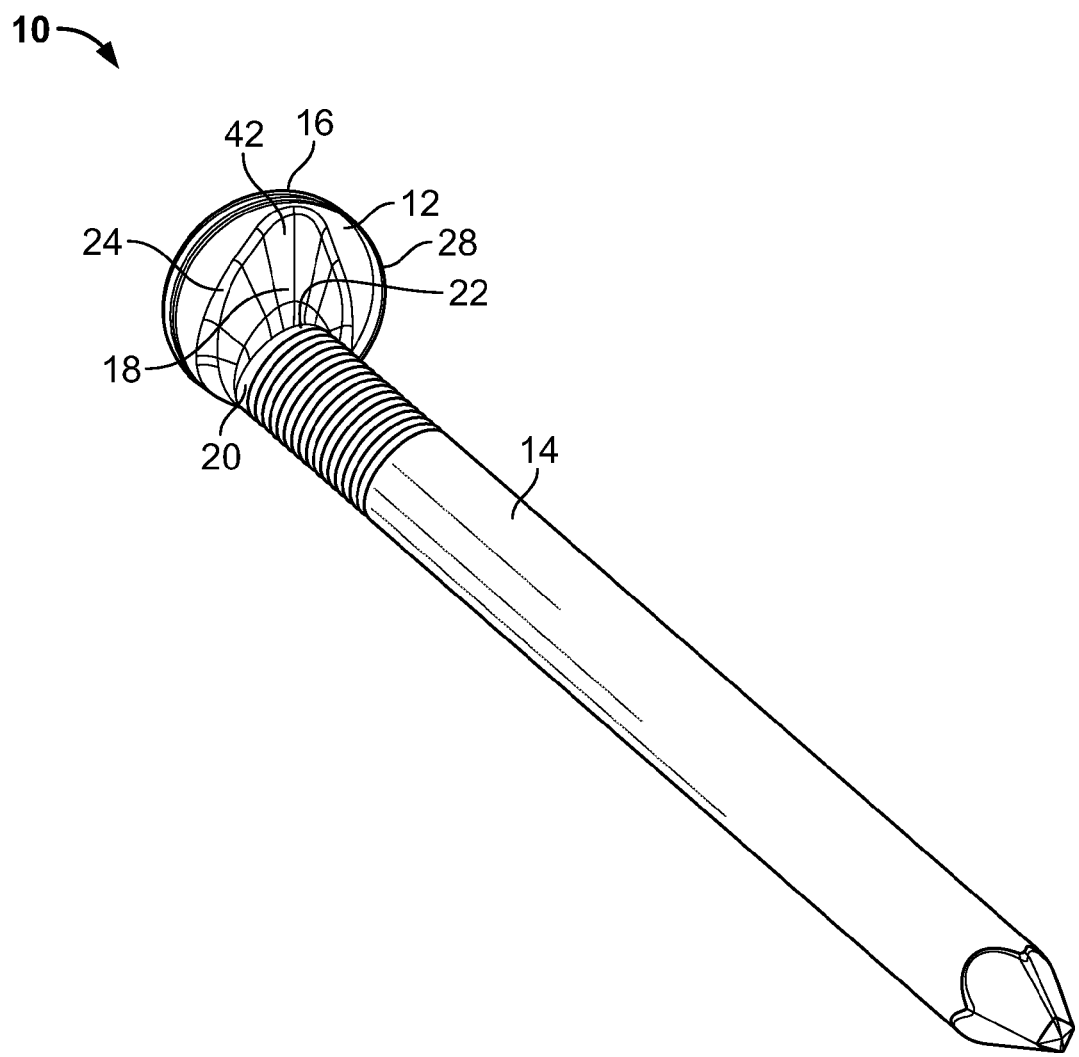
FIG. 1 is a perspective view of a present offset round head nail with supporting gusset.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description of the Invention", relates to a requirement of the United States Patent Office, and does not imply, nor should be inferred to limit the subject matter disclosed herein.

The present invention pertains particularly to an offset, gusseted, full-round head nail, methods of making the offset, gusseted full-round head nail (hereafter "heel-less nail"), and the die used to form the heel-less nail. The present heel-less nail is formed from a wire of plain or galvanized steel, aluminum, copper, stainless steel, or other metallic or non-metallic material. The present heel-less nail may have a smooth, grooved, or deformed (threaded) shank, and several of the heel-less nail can be collated into strips for use in a power tool. The heel-less nail of the present invention has a head ("head"), a nail shank ("shank"), and a gusset integrally connected to both the head and shank. The shank is positioned radially off-center from the head and is inscribed within and tangent to the circumference of the head. The gusset, in one embodiment, is an ovoid or pear shaped conical buttress providing precise and focused support to the toe of the head and an upper portion of the shank. The gusset provides added strength to the junction of the head and shank and distributes load from the head through the longitudinal axis of the shank.

The heel-less nail is manufactured by either a single blow nail heading machine or using a cold rolling process machine. For the latter, a nail wire blank is inserted into a die with a portion of the wire exposed. Through precise angled rolling of the first roller over the die, a pre-bent shape is formed. The heel-less nail is formed with a round head and a gusset using a second compression roller. The clamping die, or "gripper" is tooled with geometry complimentary to the gusset of the offset full-round head nail, but does not have an impression of the circular profile of the round head. Therefore, precise pre-bent shape, in combination with the precise ovoid gusset form, is necessary to manufacture the circular profile of the round heads of the heel-less nail. The portion of the die complimentary to the gusset facilitates the flow of metal wire to form the round head. In other words, the gusset not only strengthens the integrity of the junction of head and shank and redistributes load applied, the die portion complimentary to the gusset also facilitates in the formation of the desired circular profile of the round head.

Figure 2:
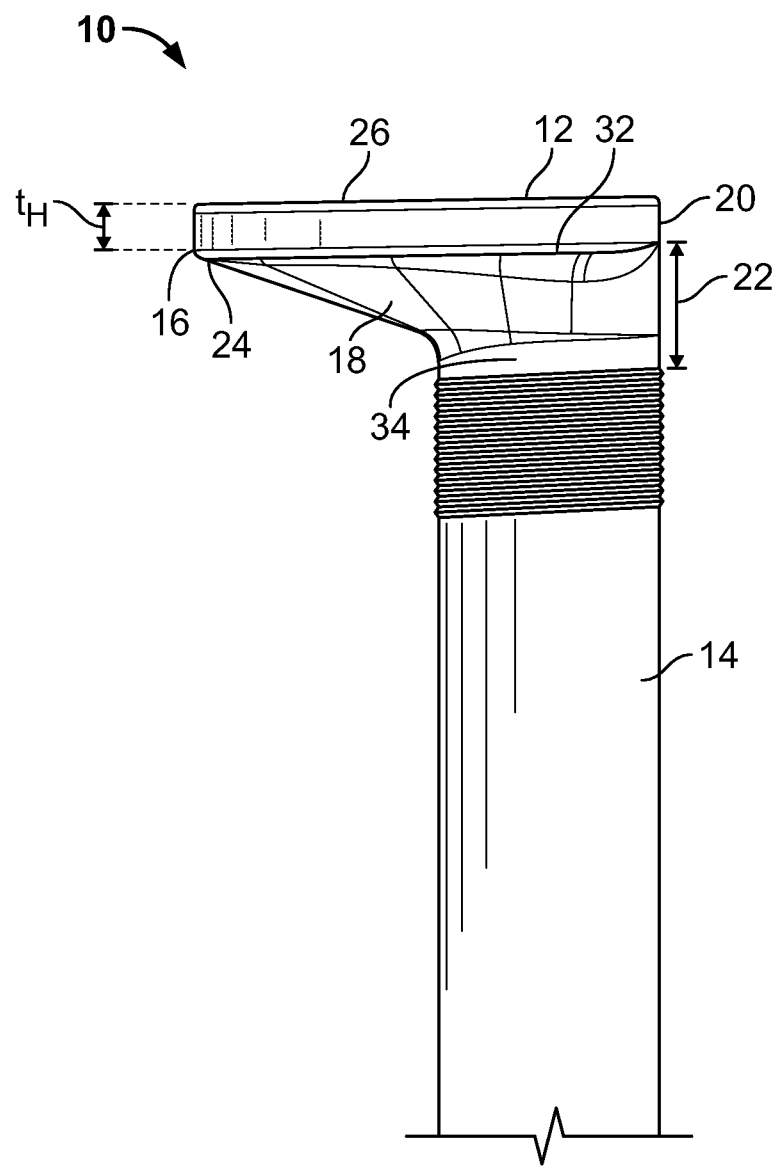
FIG. 2 is a side view of the present nail.

Referring now to the figures and in particular FIGS. 1 and 2, there is shown an embodiment of the present invention. A heel-less nail 10 is illustrated having a full-round head 12 and a shank 14. The head 12 has a circular profile having a top surface 26 and a bottom surface 24. The shank 14 is positioned within the circumference 28 of the head 12 and roughly tangential to the circumference 28 of the head 12. The portion of the head 12 unsupported by the shank 14 is the toe 16. The head 12 has a thickness $t_H$. The gusset 18 envelopes the junction 22 between the shank 14 and the head 12.

Figure 3:
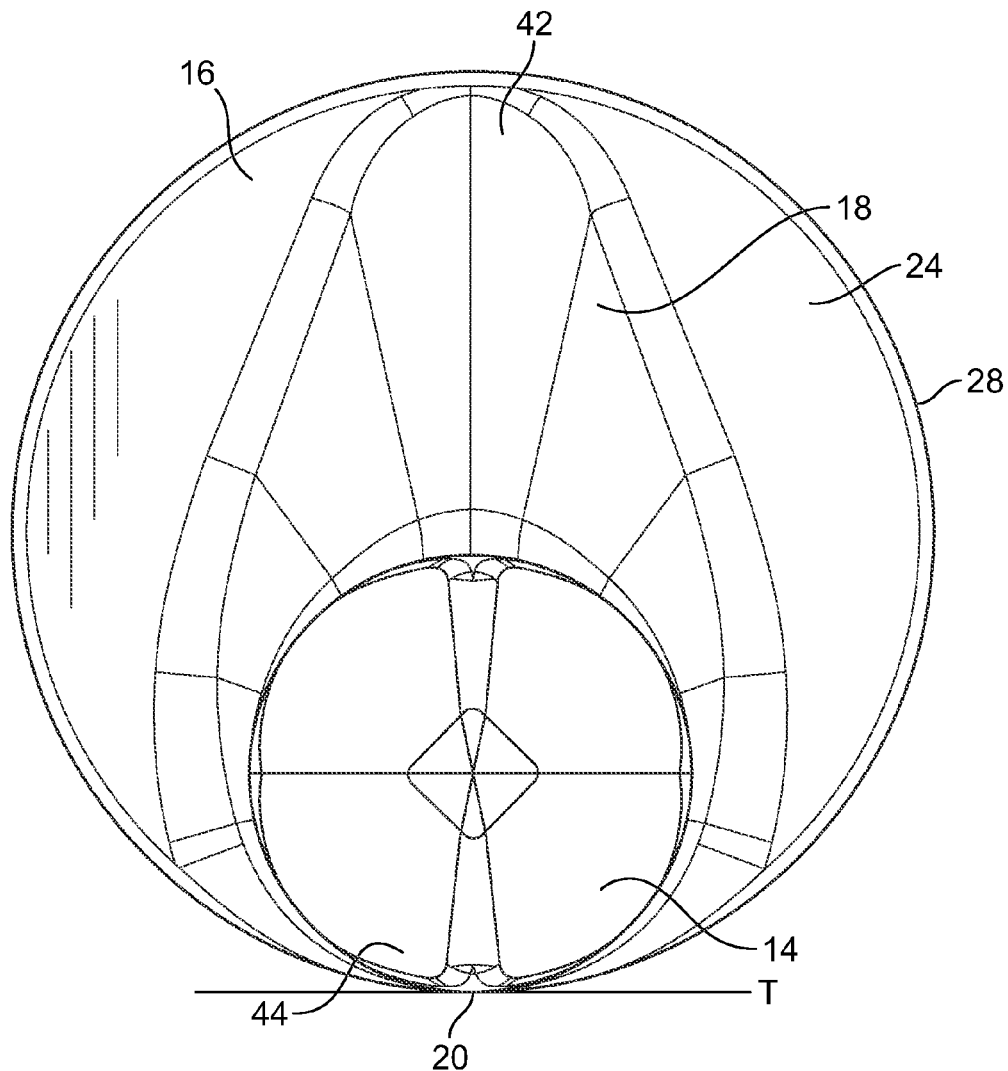
FIG. 3 is a bottom view of the present nail.

FIG. 3-5 show views from the bottom and side of the present nail 10. The undersurface 24 of the head 12 is shown, the head 12 having a circumference 28. The gusset 18 is an ovoid or pear-shaped lofted formation which tapers 42 in the direction of the toe 16 and has a rounded bottom 44. The gusset 18, in a present embodiment, is ovoid shaped, with a rounded portion 44 approximately congruent with a circumferential arc of the shank 14, thus having a nail 10 with a uninterrupted side S. The gusset 18 also has a tapered portion 42 elongated radially in the direction of the toe 16. The gusset 18 is lofted from the gusset corona 32 to the gusset base 34. The gusset 18 envelopes and is integrally connected to the junction of the shank 14 and the head 12. The gusset 18, shank 14, and head 12 are collinear with each other at T such that no heel at 20 is formed.

Figure 6:
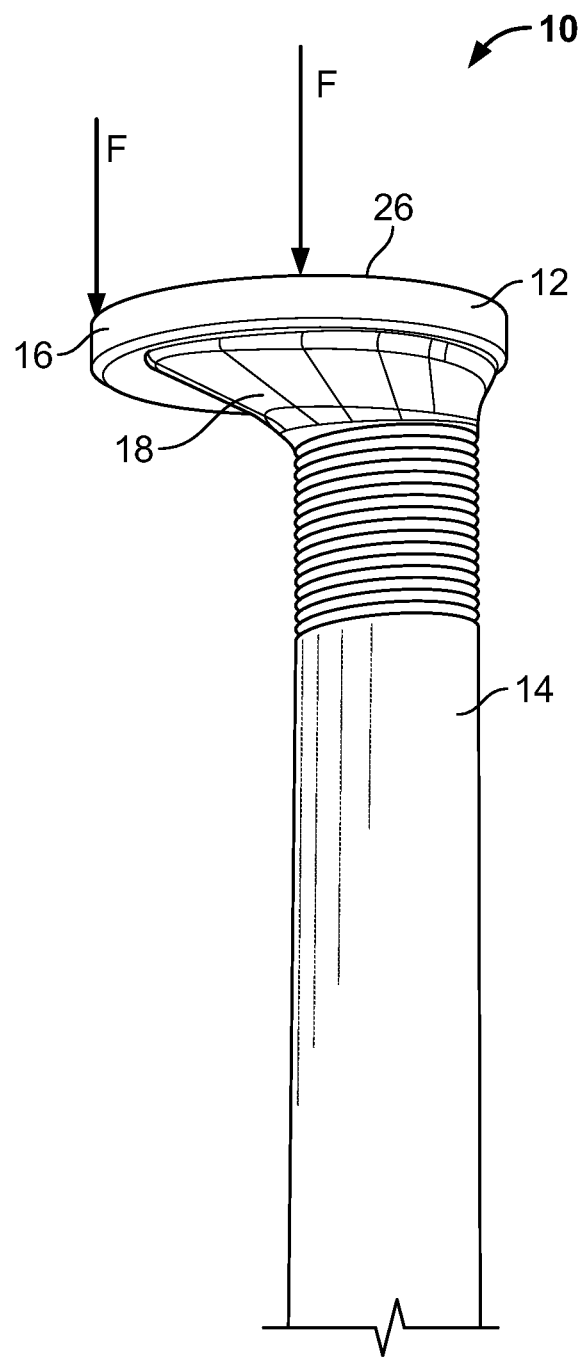
FIG. 6 is a perspective view of the present nail illustrating the deformation stresses experienced by the present nail.
Figure 7:
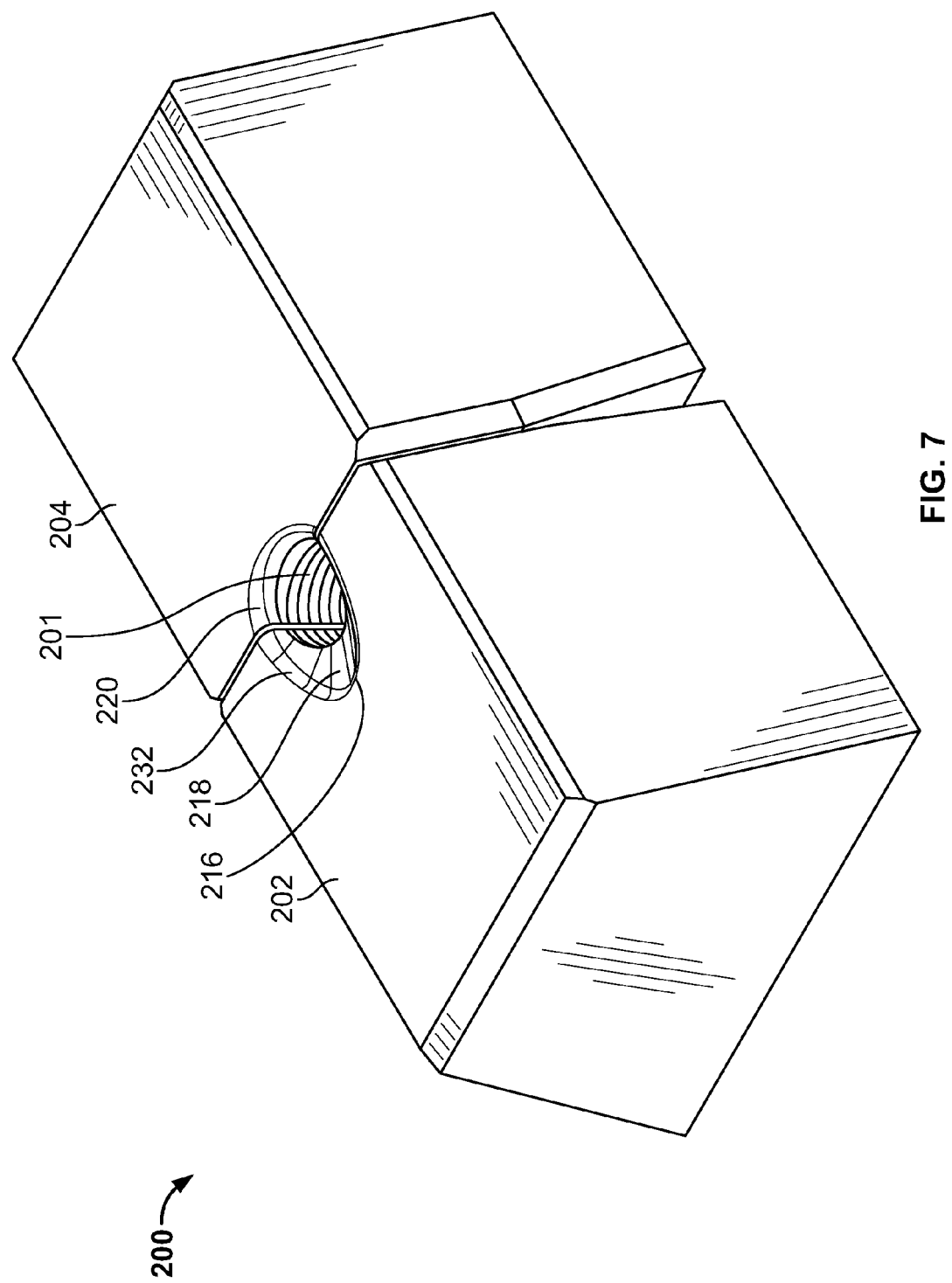
FIG. 7 is a perspective view of a die used to grip the present nail shank.

FIG. 6 simulates a load or force F produced by a power driving tool on one embodiment of the present nail. In this embodiment, the head 12 has a thickness of $35/1000$ of an inch. In comparison, typical round head offset nails have a thickness of $50/1000$ inch. The modeling diagram shown in FIG. 6 shows that an embodiment of the present nail, having a head thickness thinner than currently utilized nail heads, withstands the same amount of force that a thicker headed nail can withstand, without deforming. The shank 14 exhibits almost no stresses from the force F on the toe 16 of the head 12. The gusset 18 acts to support the toe 16 of the head 12 and re-distributes the stress borne by the toe 16 through the shank 14 of the nail 10. With the supporting gusset 18, the thinner head 12 can withstand forces at least equivalent to those borne by known offset nails having thicker heads.

Figure 8:
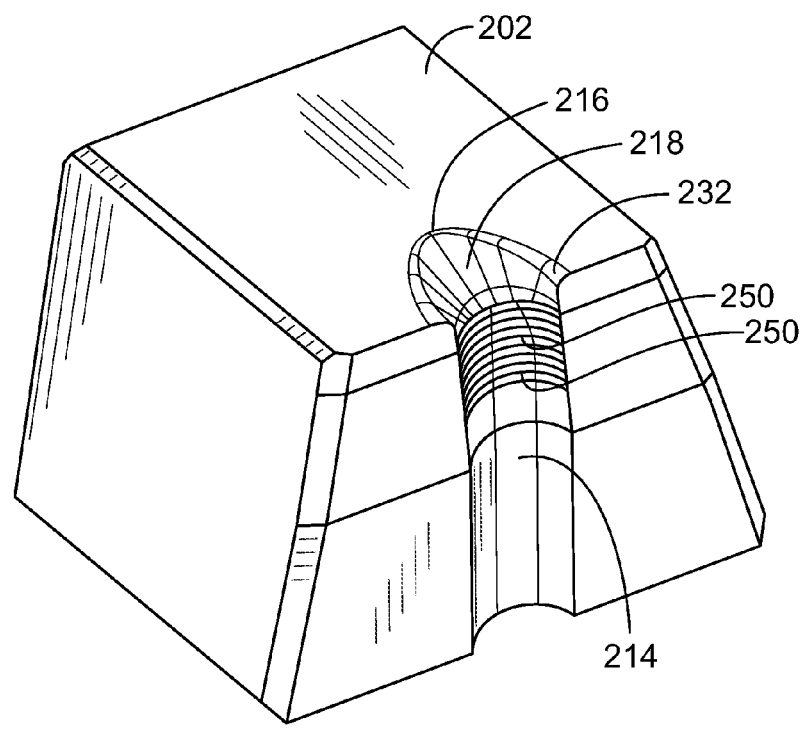
FIG. 8 is a perspective view of a first of two grippers of the present die.

FIGS. 7-10 illustrate a die 200 used to form the present heel-less nail 10. The die 200 includes an opening 201 for receiving a wire to form the heel-less nail 10 of FIG. 1. A present embodiment of the die 200 includes two grippers, 202 and 204. In FIG. 8, gripper 202 includes die cavities 214, 216, and 218 forming shapes complimentary to a portion of the shank, a portion of the head, and a portion of the gusset respectively of the present heel-less nail 10. A portion of the die complimentary to the gusset corona 232, 233 defines a perimeter of the gusset 18 of FIG. 3. The grippers 202, 204 also have grooves 250 to hold the wire in the grippers and form complimentary ridges on the shank 14 of the heel-less nail 10.

Figure 9:
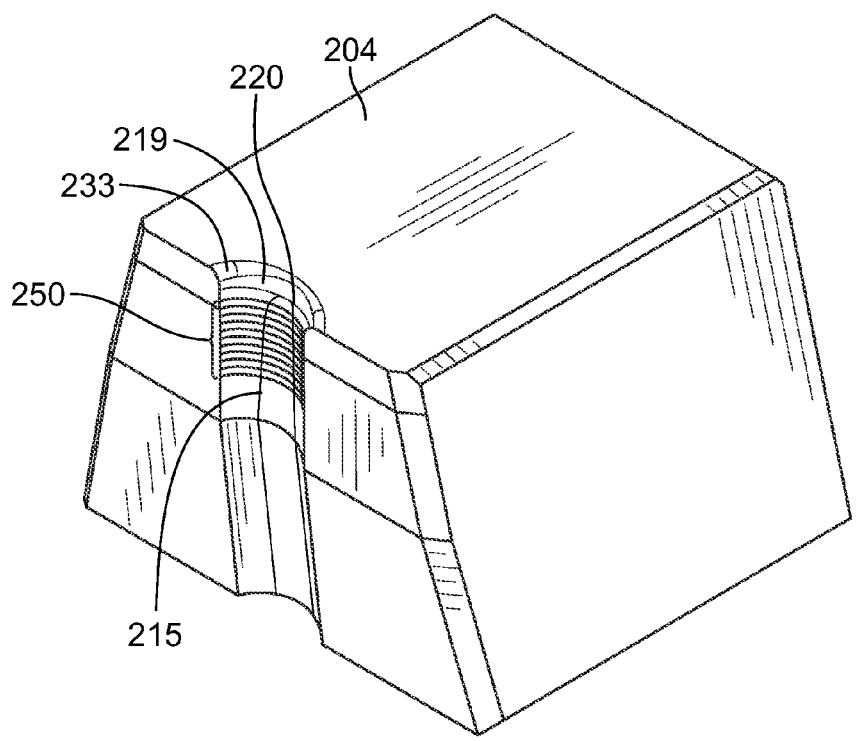
FIG. 9 is a perspective view of the of the second of two grippers of the present die.

FIG. 9 shows gripper 204 having die cavities 215, 219, and 220 complimentary to the shape of a second portion of the shank, a second portion of the head, and a second portion of the gusset. The portion complimentary to the gusset corona 233 is shown with the cavities 219 and 215 approximately collinear at 220.

Figure 10:
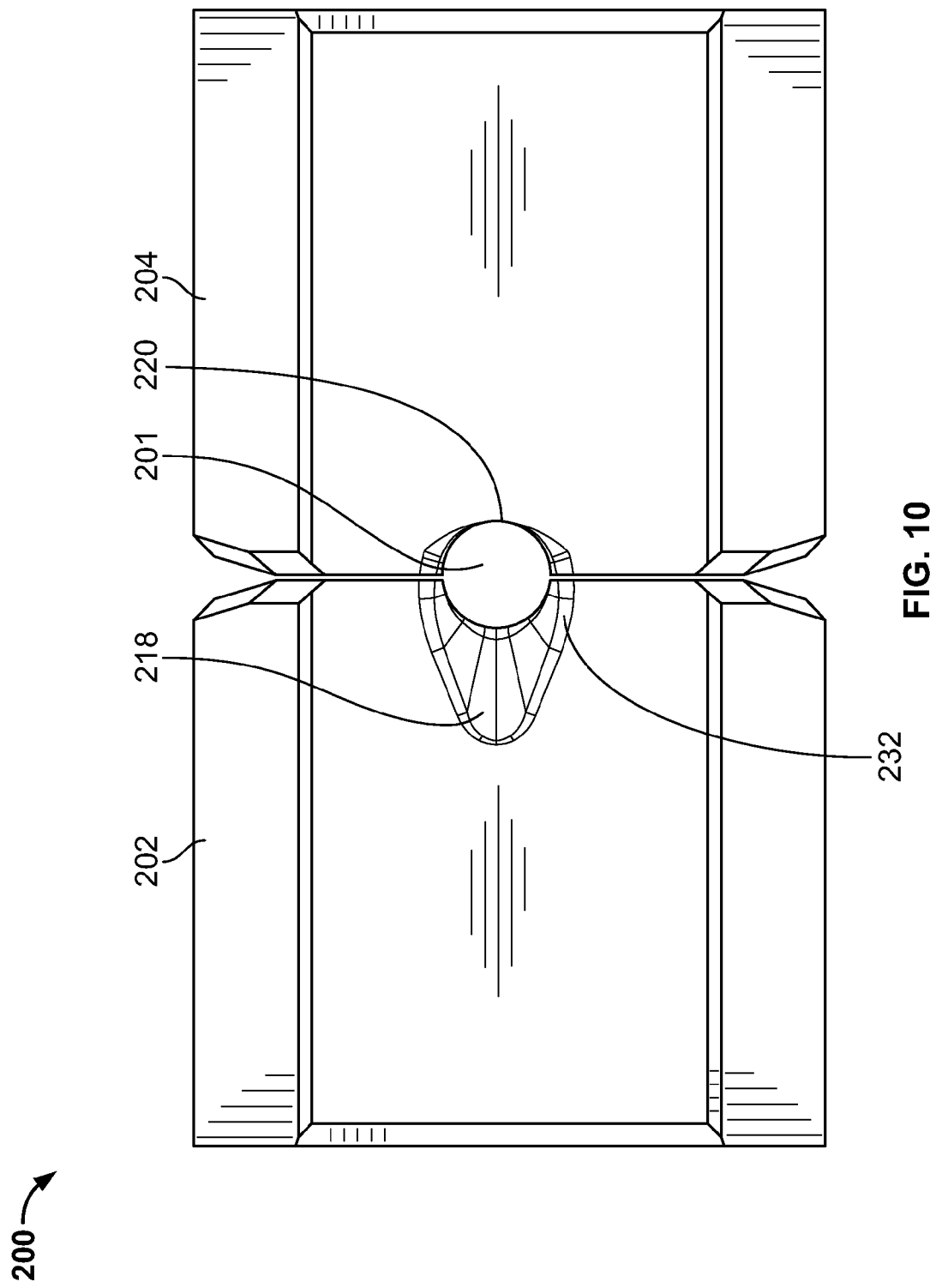
FIG. 10 is a plan view of the present die.
Figure 12:
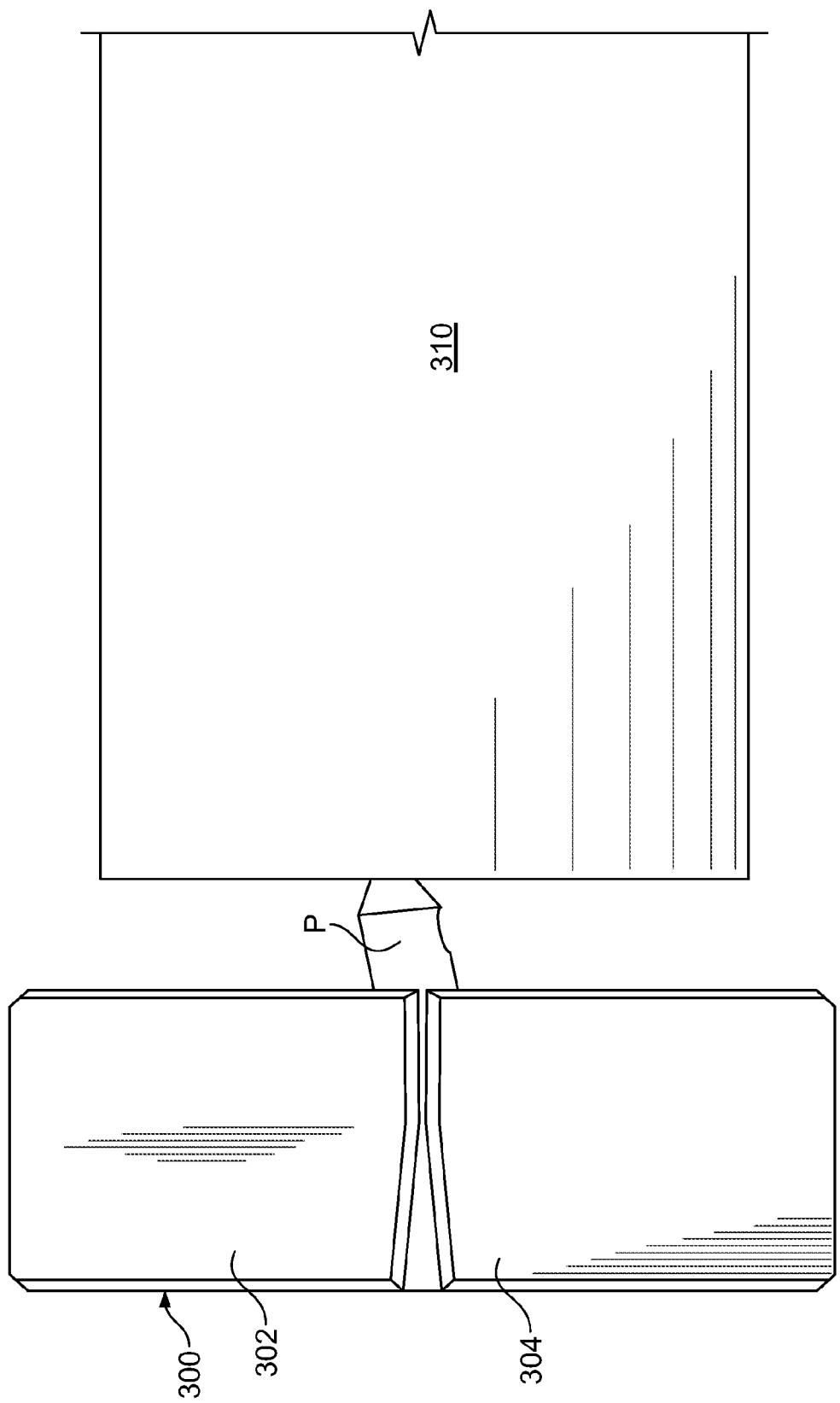
Figure 13:
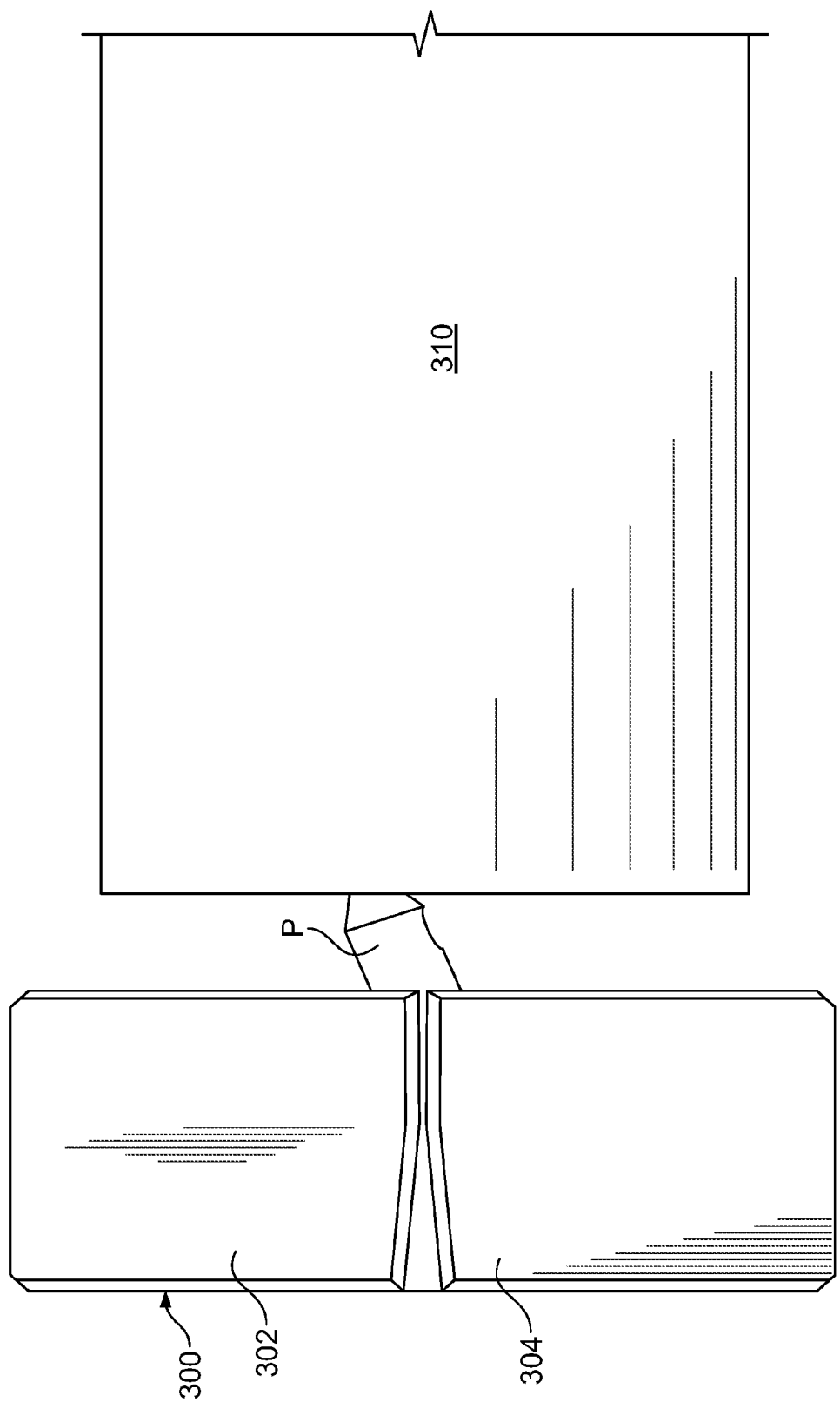
Figure 14:
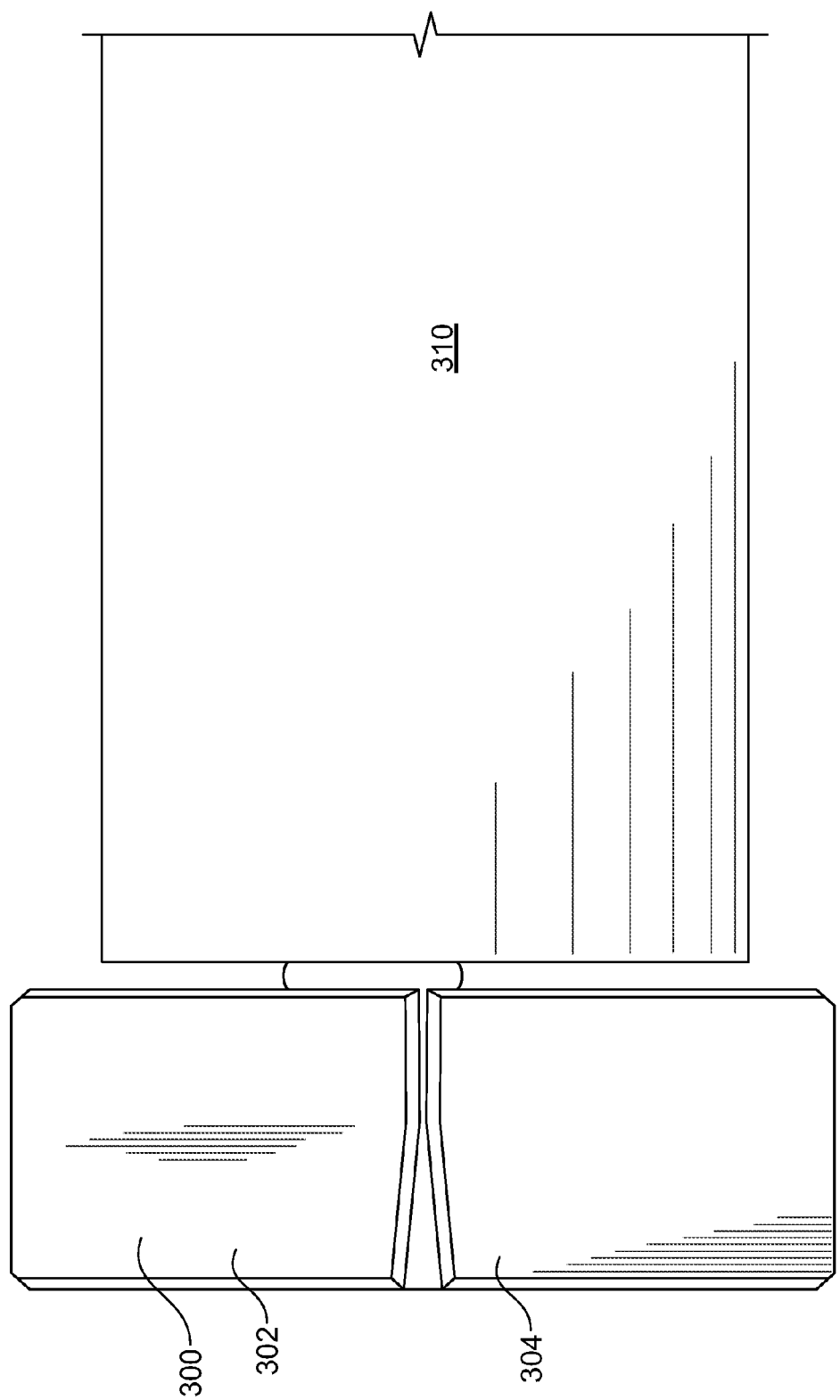

FIG. 10 illustrates a plan view of the die 200 formed by the two grippers 202, 204. An opening 201 is present when the two grippers 202, 204 are placed together. The full perimeter of the gusset corona 232, 233 is seen as an ovoid or pear shape. The head 12 is formed integral to the gusset corona 32 formed by the die portions 232, 233. The opening 201 also defines the perimeter or circumference of the shank 14.

The heel-less nail is manufactured by either a single blow nail heading machine or using a cold rolling process machine.

For single blow nail heading formation, as shown in FIG. 11-14, the wire segment W is struck with a hammer-type element 310 using a single blow designed to form a round head from the portion of the wire segment P protruding from the die 300. As shown in FIG. 11, a hammer-type instrument 310 is used to press the wire segment into offset, round-head formation. The portion of the die complimentary to the gusset facilitates the flow of metal wire to form the round head.

For the cold rolling process, a nail wire segment is inserted into a die with a portion of the wire exposed. Through precise angled rolling of the first roller over the die, a pre-bent shape is formed. The heel-less nail is then formed with a round head and a gusset using a second compression roller.

The clamping die, or "gripper", is tooled with geometry complimentary to the gusset of the offset full-round head nail, but does not have an impression of the circular profile of the round head. Therefore, precise pre-bent shape, in combination with the precise ovoid gusset form, is necessary to manufacture the circular profile of the round heads of the heel-less nail. The portion of the die complimentary to the gusset facilitates the flow of metal wire to form the round head. No cavity is present in the die as a mold or pattern for a round head; such a cavity may cause the die to break in the event of an accidental over-fill condition. In other words, the gusset not only strengthens the integrity of the junction of head and shank and redistributes load applied, the die portion complimentary to the gusset also facilitates in the formation of the desired circular profile of the round head.

The complimentary gusset portions of the present invention aids in the formation of the circular profile of the head. The complimentary gusset portions, in conjunction with the precise attitude and cubic volume of the pre-bent blank, urge the metal wire segment to flow in such a manner as to form a circular profile for a head.

No extra wire or material is needed to create the heel-less gusseted nail. Rather than forming a head thickness similar to thicknesses of heel-less nails currently available, the present die forms a head having a thickness $t_H$ as shown in FIG. 2. The present invention distributes the wire segment material such that the gusset 18 is formed, and at the same time forming a head 12 that has a thickness $t_H$ less than heel-less nails currently available, without diminishing the strength or integrity of the head 12.

The unique nail geometry provided by the gusset of the heel-less nail provides many advantages. The heel-less nail allows for closer spacing of the heel-less nails in a collating strip and as a result, less collation tape is needed. The close nail spacing also offers improved nail to nail support when the nails are ultimately discharged from the power tool, therefore offering better control and improved nail strip rigidity in handling. In addition, the strength of the nail is not compromised with a thinner head; the same amount or less material is used, but distributed in a unique fashion as to retain or increase the integrity and strength of currently available offset nails. Furthermore, the gusset provides enhanced strength and integrity at the junction of the head and the shank, preventing breakage or bending of the nail. Moreover, the desired round head for the nail is formed easily using the method and die disclosed.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method for making a heel-less nail, the method comprising the steps of:
    providing a die configured for cold forming, the die having a first and a second gripper, the first gripper configured with a first cavity complimentary to a portion of a nail shank and a first cavity complimentary to a portion of an nail gusset, the second gripper configured with a second cavity complimentary to second portion of the nail shank and a second cavity complimentary to second portion of the nail gusset, wherein the second cavity complimentary to the second portion of the nail gusset and the second cavity complimentary to the second portion of the nail shank have a region of collinearity along a plane defined by a surface of the second gripper;
    inserting a wire into the die, the wire having an exposed end;
    prebending the wire to create a precise pre-bent form using a first roller; and
    forming the nail gusset, and a round nail head using a second pressure roller.

2. A method for manufacturing a heel-less nail, the heel-less nail having a full-round head, a shank, and a gusset, the method comprising:
    positioning a wire segment in a die wherein a portion of the wire segment is positioned outside of the die;
    forming the wire segment into a blank using a pre-bend roller, the wire segment containing the precise cubic material volume needed to form the gusset and the head;
    compressing the wire segment in the die to form the full round head and the gusset via a compression roller, wherein the head and the gusset have a region of collinearity along a plane defined by a surface of the die.

* * * * *